US011336332B2

(12) United States Patent
Spick et al.

(10) Patent No.: US 11,336,332 B2
(45) Date of Patent: May 17, 2022

(54) CONTACTLESS COMMUNICATION REPEATER REMOTE POWER DEVICE FOR A MOTOR VEHICLE DOOR HANDLE

(71) Applicants: Continental Automotive France, Toulouse (FR); Continental Automotive GmbH, Hannover (DE)

(72) Inventors: Gabriel Spick, Toulouse (FR); Olivier Gérardière, Tournefeuille (FR); Yannis Escalante, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 269 days.

(21) Appl. No.: 16/645,867

(22) PCT Filed: Sep. 13, 2018

(86) PCT No.: PCT/EP2018/074734
§ 371 (c)(1),
(2) Date: Mar. 10, 2020

(87) PCT Pub. No.: WO2019/053123
PCT Pub. Date: Mar. 21, 2019

(65) Prior Publication Data
US 2020/0259525 A1   Aug. 13, 2020

(30) Foreign Application Priority Data

Sep. 14, 2017 (FR) ...................................... 1758537

(51) Int. Cl.
*H04B 5/00* (2006.01)
*H02J 50/10* (2016.01)
(Continued)

(52) U.S. Cl.
CPC ........... *H04B 5/0037* (2013.01); *E05B 81/77* (2013.01); *E05B 81/88* (2013.01); *E05B 85/103* (2013.01);
(Continued)

(58) Field of Classification Search
CPC .. H04B 5/0037; H04B 5/0031; H04B 5/0081; H02J 50/10; H02J 50/50; E05B 81/88;
(Continued)

(56) References Cited

U.S. PATENT DOCUMENTS 10,428,562 B2   10/2019   Guibbert et al.
10,501,967 B2 *  12/2019   Brown ................. E05B 85/103
(Continued)

FOREIGN PATENT DOCUMENTS

CN   201278162 Y   7/2009
CN   205486369 U   8/2016
(Continued)

OTHER PUBLICATIONS

Chinese Office Action for Chinese Application No. 201880073446.3, dated Jun. 3, 2021, with translation, 21 pages.
(Continued)

*Primary Examiner* — Carlos Amaya
(74) *Attorney, Agent, or Firm* — RatnerPrestia

(57) ABSTRACT

A device for a handle of a motor vehicle door. The device includes, integrated into the door, a primary module that supplies power by inductive coupling to a secondary module integrated into the handle. The primary module includes a primary coil and the secondary module having a secondary coil positioned facing the primary coil. The secondary coil also serves as a repeater for contactless communication between the primary module and a terminal. If the handle is retractable, the device also allows the position of the handle
(Continued)

during its movement between a deployed position and a retracted position to be estimated.

11 Claims, 5 Drawing Sheets

(51) Int. Cl.
　　　H02J 50/50　　　(2016.01)
　　　E05B 81/76　　　(2014.01)
　　　E05B 81/88　　　(2014.01)
　　　E05B 85/10　　　(2014.01)
　　　G06K 7/10　　　(2006.01)
　　　G07C 9/00　　　(2020.01)
(52) U.S. Cl.
　　　CPC ........ *E05B 85/107* (2013.01); *G06K 7/10178* (2013.01); *G07C 9/00309* (2013.01); *H02J 50/10* (2016.02); *H02J 50/50* (2016.02); *H04B 5/0031* (2013.01); *H04B 5/0081* (2013.01); *G07C 2209/65* (2013.01)

(58) Field of Classification Search
　　　CPC . E05B 85/103; E05B 85/107; G06K 7/10178; G07C 9/00309; G07C 2209/65
　　　See application file for complete search history.

(56) References Cited

U.S. PATENT DOCUMENTS

2011/0140479 A1　6/2011　Okada et al.
2013/0127185 A1　5/2013　Lang et al.

FOREIGN PATENT DOCUMENTS

DE　　102015119096 A1　5/2017
FR　　2917112 A1　12/2008
FR　　3038642 A1　1/2017

OTHER PUBLICATIONS

International Search Report and Written Opinion for International Application No. PCT/EP2018/074734, dated Nov. 16, 2018, 10 pages.

* cited by examiner a)

b)

(a)

(b)

(c)

CONTACTLESS COMMUNICATION REPEATER REMOTE POWER DEVICE FOR A MOTOR VEHICLE DOOR HANDLE

CROSS REFERENCE TO RELATED APPLICATIONS

This application is the U.S. National Phase Application of PCT International Application No. PCT/EP2018/074734, filed Sep. 13, 2018, which claims priority to French Patent Application No. 1758537, filed Sep. 14, 2017, the contents of such applications being incorporated by reference herein.

FIELD OF THE INVENTION

The present invention belongs to the field of electromagnetic induction applied to energy transmission, contactless communication and position sensor functions. The invention relates in particular to a remote power supply that plays the role of a contactless communication repeater for a motor vehicle door handle.

BACKGROUND OF THE INVENTION

In recent motor vehicles, the handles of the doors increasingly often incorporate an electronic module configured to perform certain functions such as for example detecting the presence of the user of the vehicle and/or authenticating this user. This handle module must then generally communicate information to another main electronic module that is integrated for its part into the door.

It is known to connect a handle module to a door module using electrical cables so as to supply electric power to the handle module and possibly to allow information to be exchanged between the two electronic modules in a wired manner.

Such electrical cabling between the door module and the handle module however entails numerous drawbacks. Specifically, besides the cost and the bulk that they constitute in the handle module, the electrical cables impose significant mechanical integration constraints during the manufacture of the vehicle.

In order to allow more advanced functions, such as for example the use of a time-limited virtual key provided in the context of a loan of the vehicle or a car-sharing application, or indeed access to data on the vehicle from outside the vehicle, it may be necessary to establish a contactless communication between the main module integrated into the door and a terminal such as a cell phone, or indeed an electronic bracelet or a card.

The door module is generally integrated into the door nearby the handle in order to optimize the communication between the door module and the handle module. This however has a drawback with respect to the contactless communication that must be setup between the terminal and the door module because, in this case, the presence of the handle between the terminal and the door module may prevent these two elements from being sufficiently close to each other to be able to set up a so-called "near field" contactless communication.

In a motor vehicle, it is also known to use deployable handles for the doors. Such a handle is in the retracted position inside the door most of the time, that is to say that it is flush with the body of the door so as to be virtually invisible, and it is in the deployed position only when a user needs to open the door from outside the vehicle. There are two main advantages to using a deployable handle. The first advantage is improved aerodynamic performance due to better streamlining of the vehicle when the handles of its doors are in the retracted position. The second advantage concerns esthetics.

In the case of a deployable handle, the door module generally incorporates a position sensor with a view to automatically controlling a motor that allows the handle to be deployed. The fact that a handle is deployable adds additional mechanical integration constraints since the electrical enables that connect the door module to the handle module must accommodate the movement of the handle module and not impede it.

To dispense with electrical cables, it is known for example to use magnetic-induction wireless electric power supply devices. There are also numerous devices for wireless communication between two electronic modules, for example using NFC (acronym for "near-field communication") or Bluetooth technology. It is also known to use inductive sensors to determine the position of a target in relation to the sensor. For example, LVDT (acronym for "linear variable differential transformer") sensors are based on the variation, depending on the position of an electrically conductive target, in the voltages induced in two secondary coils by the magnetic field generated by a primary coil. The proliferation of these devices in an electronic door handle module however goes against the miniaturization thereof and reducing its complexity and its cost.

SUMMARY OF THE INVENTION

An aim of an aspect of the present invention is to rectify all or some of the drawbacks from the prior art, in particular those outlined above.

To this end, and according to a first aspect, the invention relates to a device for a motor vehicle door handle comprising a primary module integrated into the door and a secondary module integrated into the handle. The primary module comprises a primary coil and the secondary module comprises a secondary coil arranged facing said primary coil. The primary module is configured to form an electromagnetic field suitable for supplying electric power to the secondary module by magnetic induction between the primary coil and the secondary coil. The primary module comprises a communication circuit suitable for exchanging information with a terminal by means of the primary coil. The secondary module comprises a communication circuit suitable for exchanging information with the terminal and the primary module by means of the secondary coil, and configured to repeat to the primary module the information sent by the terminal and intended for said primary module, and/or to repeat to the terminal the information sent by the primary module and intended for said terminal.

It will be noted that by the expression "exchanging information" what is meant is the transmission of information in one direction, or in the other direction, or in both directions.

With such arrangements, the secondary module is supplied with electric power by the primary module by inductive coupling, and it furthermore plays the role of repeater for a wireless communication that must be set up between the primary module integrated into the door and a terminal, such as for example a cell phone.

In particular embodiments, the invention may furthermore comprise one or more of the following features, taken alone or in any technically feasible combination.

In particular embodiments, the communication circuits are furthermore configured to exchange information between the primary module and the secondary module independently of the terminal.

In particular embodiments, the handle is retractable with respect to the door, and the primary coil and the secondary coil remain facing each other when the handle moves between a retracted position and a deployed position with respect to the door. Thus, the transmission of electric energy and the communication between the primary module and the secondary module remain functional even if the handle is moved.

In particular embodiments, the secondary module furthermore comprises a control circuit configured to measure a parameter representative of an amplitude of the magnetic field flux generated by the primary coil through the secondary coil, and to estimate, depending on said measurements, the position of the handle during its movement between the retracted position and the deployed position.

The meaning of "amplitude of the magnetic field flux" is defined below. As a reminder, the flux of the magnetic field $\vec{B}$ through an infinitesimal element of oriented area $\vec{dS}$ is the scalar product of these two vectors. The flux of the magnetic field $\vec{B}$ through an area S is then the integral:

$$\phi = \iint_S \vec{B} \cdot \vec{dS}$$

Also, the magnetic field $\vec{B}$ in a coil whose turns are circular is oriented along the axis of the coil, and its amplitude is defined theoretically by:

$$B = \mu_0 \frac{N \cdot i}{l} \quad (1)$$

in which expression $\mu_0$ is the magnetic permeability of free space, N is the number of turns of the coil, l is the length of the coil, and i is the current flowing through the turns of the coil.

Ignoring the effects at the edges of the coil, that is to say considering the field B to be constant and defined by (1) at any point of an area S of a cross section of the coil, the magnetic field flux generated by the coil and passing through the area S is then:

$$\phi = B \cdot S = \mu_0 \frac{N \cdot i}{l} \cdot S \quad (2)$$

If the current i flowing through the coil varies, for example in the form of a sinusoidal AC current, then the same applies for the magnetic field flux passing through the area S. For the remainder of the description, "the amplitude of the magnetic field flux" is defined as being the maximum value that the flux of the magnetic field is able to take at a given time. This corresponds to the envelope of the signal that represents the variation in the magnetic field flux over time. Thus, if the current i flowing through the coil is a sinusoidal AC current, it may be expressed in the form $i = A \cdot \sin(\omega \cdot t)$, in which expression co corresponds to the angular frequency of said sinusoidal AC current, then the amplitude of the magnetic field flux may be expressed, with reference to expression (2) above, using the following expression:

$$\varphi = \mu_0 \frac{N \cdot A}{l} \cdot S \quad (3)$$

The magnetic field generated by a primary coil and passing through a secondary coil placed facing said primary coil will depend on several factors, in particular the distance between the primary coil and the secondary coil. The larger this distance, as is the case when the handle is in deployed position, the lower the amplitude of the magnetic field flux generated by the primary coil through the secondary coil. It is thus possible to estimate the position of the handle from a measurement representative of the amplitude of the magnetic field flux generated by the primary coil through the secondary coil.

In particular embodiments, the parameter representative of the amplitude of the magnetic field flux generated by a primary coil through the secondary coil is an amplitude of a voltage induced in said secondary coil.

In particular embodiments, the control circuit of the secondary module is furthermore configured to activate or deactivate, depending on the estimated position of the handle, the repetition of the information exchanged between the primary module and the terminal.

Specifically, when the handle is retracted, it potentially no longer forms an obstacle to the communication between the primary module and the terminal, and the repeater function of the secondary module is then no longer required.

In particular embodiments, the primary module furthermore comprises a control circuit configured to measure a parameter representative of the amplitude of the magnetic field flux generated by the primary coil through the secondary coil, and to estimate, depending on said measurements, the position of the handle during its movement between the retracted position and the deployed position.

In particular embodiments, the parameter representative of the amplitude of the magnetic field flux generated by the primary coil through the secondary coil is an amplitude of a load current flowing through said primary coil.

In particular embodiments, the control circuit of the primary module is furthermore configured so as to control, depending on the estimated position of the handle, a motor that moves the handle with respect to the door.

In particular embodiments, the primary coil and the secondary coil have an axis substantially perpendicular to the plane of the door. With such arrangements, the communication with the terminal is optimized because the secondary coil is then generally facing an antenna of said terminal when it is close to the handle.

According to a second aspect, the invention relates to a motor vehicle door comprising a device according to any one of the embodiments of the invention.

According to a third aspect, the invention relates to a motor vehicle comprising a door with a device according to any one of the embodiments of the invention.

BRIEF DESCRIPTION OF THE DRAWINGS

Aspects of the invention will be better understood upon reading the following description, given by way of entirely nonlimiting example and with reference to the following FIGS. 1 to 5.

Figure 1:
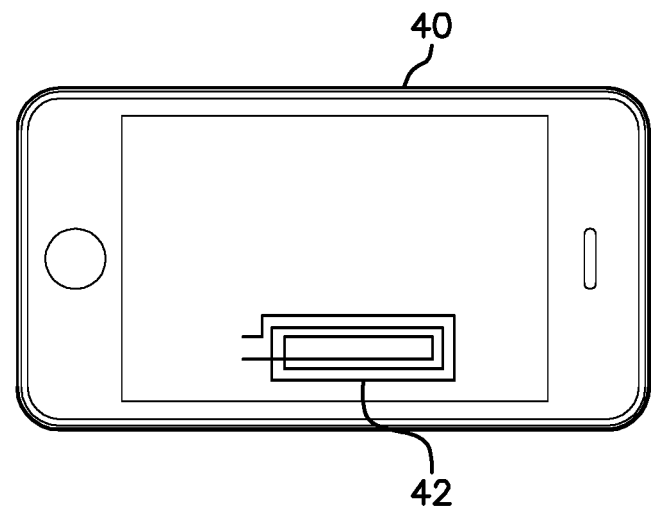
FIG. 1: a schematic representation of a primary module and of a secondary module for a device according to an aspect of the invention.
Figure 1:
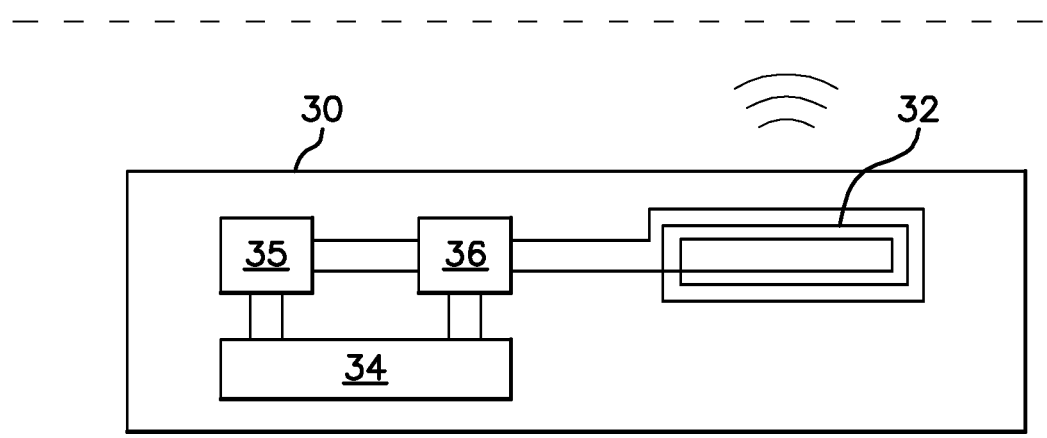
Figure 1:
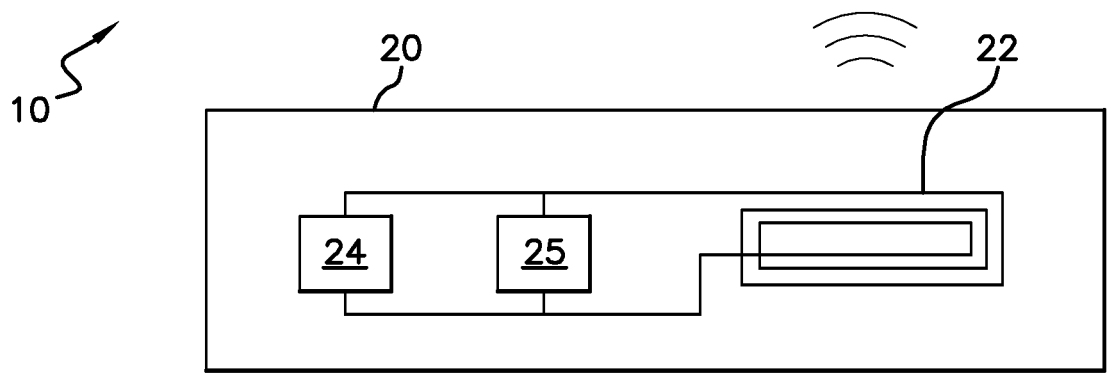

In these figures, identical references from one figure to another denote identical or analogous elements. For the sake of clarity, the elements shown are not to scale, unless indicated otherwise.

DETAILED DESCRIPTION OF THE PREFERRED EMBODIMENTS

Such as indicated above, an aspect of the present invention relates to a device 10 comprising a primary electronic module 20 integrated into a motor vehicle door 11 and a secondary electronic module 30 integrated into the handle 12 of said door 11. It should be noted that the term "door" may refer here equally to a side door, a trunk door, or else any other type of opening element of the vehicle.

In this device 10, the primary module 20 is responsible for the remote supply of power to the secondary module 30. "Remotely supplying power" or "remote power supply" is understood to mean the wireless transmission of electrical energy from the primary module 20 to the secondary module 30 by electromagnetic coupling.

In this device 10, the secondary module 30 may furthermore play the role of repeater in order to allow a contactless communication between the primary module 20 and a terminal 40 such as for example a cell phone, an electronic card or a bracelet. By "contactless communication" what is meant is a wireless communication over a very short distance, i.e. a distance of a few centimeters, or even at most a few tens of centimeters.

In particular embodiments, if the handle 12 incorporating the secondary module 30 is retractable with respect to the door 11 incorporating the primary module 20, the device 10 may furthermore allow the position of the handle 12 to be estimated, in particular in order to determine whether the handle 12 is in the retracted position or in deployed position.

As will be detailed in the rest of the description, one particularity of the device 10 according to an aspect of the invention is that identical means, namely a primary coil 22 and a secondary coil 32, are used to perform the functions required to remotely supply power and communicate contactlessly, or even, where appropriate, to sense position.

FIG. 1 schematically shows such a device 10. It comprises a primary module 20 that corresponds to the door module and a secondary module 30 that corresponds to the handle module.

The primary module 20 is for example supplied with power by the electrical system of the vehicle and may be connected to other electronic modules (controllers, computers, sensors, etc.) via a multiplexed bus such as a CAN bus (CAN being the acronym of Controller Area Network). These elements are not shown in FIG. 1.

The primary module 20 comprises a primary coil 22 that, in the example in question, is supplied with electric power using an AC voltage. An AC current therefore flows through the primary coil 22, which then generates an electromagnetic field.

The primary module 20 also comprises an electronic circuit, called the communication circuit, 25 that may comprise, as is conventional, one or more microcontrollers, and/or programmable logic circuits (of FPGA, PLD, etc. type) and/or specialized integrated circuits (ASIC), and/or a set of discrete electronic components, and a set of means, considered to be known to those skilled in the art for performing signal processing (analog filter, amplifier, analog-to-digital converter, sampler, etc.). The communication circuit 25 is for example configured to modulate the voltage applied across the terminals of the primary coil 22 depending on information to be sent to the secondary module 30 or indeed a terminal 40 such as a cell phone or indeed an electronic card or a bracelet. The communication circuit 25 may also be configured to receive, by means of a signal that modulates the voltage across the terminals of the primary coil 22, information sent by the secondary module 30 or by the terminal 40.

In particular embodiments, the primary module 20 may also comprise an electronic circuit called the "control circuit", 24, which may comprise, as is conventional, one or more microcontrollers and/or programmable logic circuits (of FPGA, PLD, etc. type) and/or specialized integrated circuits (ASIC), and/or a set of discrete electronic components. As will be described below with reference to FIG. 5, in the case where the handle 12 incorporating the secondary module 30 is deployable, the control circuit 24 may for example use, as input parameters, the variations in current in the primary coil 22 to estimate the position of a secondary coil 32 of the secondary module 30, which coil is placed facing the primary coil 22. This may in particular make it possible to determine whether the handle 12 is in deployed position or in retracted position. The amplitude 52 of the electrical current in the primary coil 22 varies depending on the strength of the magnetic coupling that exists between the primary coil 22 and the secondary coil 32. The strength of the magnetic coupling varies depending on the distance separating the primary coil 22 from the secondary coil 32, i.e. depending on the position of the handle 12, which varies between the deployed position and the retracted position. It should be noted that this variation in the amplitude 52 of the electric current flowing through the primary coil 22 is observed because the primary coil 22 is supplied by a voltage generator, i.e. it is driven with a voltage. It would also be possible for the primary coil 22 to be driven with a current, by supplying it with a current generator. In this case, it is a variation in the amplitude of the voltage across the terminals of the primary coil 22 that would be observed during the movement of the secondary coil 32. The control circuit 24 may also control the motor responsible for deploying the handle 12 of the door 11. The motor is then controlled depending on the estimated position of the secondary module 30 in relation to the primary module 20.

It should be noted that, in the example in question, the primary coil 22 is fixed with respect to the primary module 20, the secondary coil 32 is fixed with respect to the secondary module 30, the primary module 20 is fixed with respect to the door 11, and the secondary module 30 is fixed with respect to the handle 12, Estimating the position of the primary coil 22 with respect to the secondary coil 32 is then equivalent to estimating the position of the primary module 20 with respect to the secondary module 30, or indeed to estimating the position of the handle 12 with respect to the door 11.

In the example illustrated in FIG. 1, the communication circuit 25 and the control circuit 24 are two separate circuits, but nothing prevents them from physically corresponding to one and the same electronic circuit, certain components of which could simultaneously perform functions inherent to both thereof.

The secondary module 30 comprises a secondary coil 32 positioned facing the primary coil 22 (for example the axis of the primary coil 22 is substantially the same as that of the secondary coil 32). The secondary coil 32 is then the seat of currents induced by the magnetic field that is generated by the flow of AC electric current through the primary coil 22 and that passes through the secondary coil 32. The amplitude of the magnetic field flux generated by the primary coil 22 through the secondary coil 32 increases as the distance separating the secondary coil 32 and the primary coil 22 decreases. Thus, in the case of a deployable handle 12, the amplitude of the magnetic field flux that is generated by the primary coil 22 and that passes through the secondary coil 32 will be higher when the handle 12 is in retracted position than when it is in deployed position.

The secondary module 30 also comprises an electronic circuit, called the communication circuit, 35 that may comprise, as is conventional, one or more microcontrollers, and/or programmable logic circuits (of FPGA, PLD, etc. type) and/or specialized integrated circuits (ASIC), and/or a set of discrete electronic components, and a set of means, considered to be known to those skilled in the art for performing signal processing (analog filter, amplifier, analog-to-digital converter, sampler, etc.). The communication circuit 35 is for example configured to modulate the voltage applied across the terminals of the secondary coil 32 depending on information to be sent to the primary module 20 or indeed the terminal 40. The communication circuit 35 may also be configured to receive, by means of a signal that modulates the voltage across the terminals of the secondary coil 32, information sent by the primary module 20 or by the terminal 40.

The secondary module 30 may also comprise, in particular embodiments, an electronic control circuit 34 that may comprise, as is conventional, one or more microcontrollers, and/or programmable logic circuits (of FPGA, PLD, etc. type), and/or specialized integrated circuits (ASIC), and/or a set of discrete electronic components, and one or more sensors for detecting for example the approach of the hand or of a fob of a user, which may ultimately then trigger the deployment of the handle 12, the locking or the unlocking of the door 11. The control circuit 34 may be configured to communicate with the communication circuit 35 with a view, for example, to sending, to the primary module 20, information on the presence or the authentication of a user.

In the case where the handle 12 incorporating the secondary module 30 is deployable, the control circuit 34 may for example use, as input parameters, the variations in voltage in the secondary coil 32 to estimate the position of said secondary module 30 with respect to the primary module 20. This may in particular make it possible to determine whether the handle 12 is in deployed position or in retracted position. Specifically, the amplitude 53 of the voltage across the terminals of the secondary coil 32 varies depending on the strength of the magnetic coupling that exists between the primary coil 22 and the second coil 32, and the strength of the magnetic coupling is dependent on the distance separating the primary coil 22 from the second coil 32, i.e. on the position of the handle 12, which varies between the deployed position and the retracted position.

A circuit, called the "remote power supply circuit", 36 makes it possible to recover the electrical energy transmitted by magnetic induction between the primary coil 22 and the secondary coil 32 in order to supply electric power to the secondary module 30, and in particular the control circuit 34 and the communication circuit 35. It may for example comprise a rectifier (AC-to-DC converter) in order to supply the secondary module 30 with a DC voltage or current generated from the AC voltage or current induced in the secondary coil 32.

The control circuit 34, the communication circuit 35 and the remote power supply circuit 36 have been shown as separate circuits in FIG. 1, but nothing prevents them for example from corresponding physically to one and the same electronic circuit and from sharing certain components.

Below, in the rest of the description, and by way of completely nonlimiting example, the contactless communication links set up between the primary module 20, the secondary module 30 and the terminal 40 will be considered to employ NFC communication technology (NFC being the acronym of Near Field Communication). NFC technology is a contactless radiofrequency communication technology based on the standard ISO/CEI 14443. It is based on the HF-RFID technology (HF-RFID being the acronym of High-Frequency RF Identification) at 13.56 MHz. It allows two devices separated by a very small distance (a few centimeters) to be made to communicate with a low electrical consumption, and is relatively easy to implement.

In the rest of the description, by way of nonlimiting example, the terminal 40 will be considered to be a cell phone supporting NFC technology. It therefore possesses an antenna 42 that allows, by magnetic coupling with an antenna of another module (such as for example the secondary coil 32 of the secondary module 30 or the primary coil 22 of the primary module 20), a communication therewith to be set up. Communication between the cell phone 40 and the primary module 20 may prove to be necessary, for example, to exchange an identifier that plays the role of a time-limited virtual key that is stored in the memory of the cell phone 40, in the context of a car-sharing application. According to another example, the primary module 20 may send, to the cell phone 40, information giving access to data on the vehicle (fuel level, need for maintenance, etc.). According to yet another example, the NFC communication between the cell phone 40 and the primary module 20 may serve to initiate gateways (pairing) with other technologies allowing data transfers at higher data rates than those of NFC (for example Bluetooth, Wi-Fi or Wi-Fi Direct).

The presence of the handle 12 between the cell phone 40 and the primary module 20 may prevent these two elements from getting close enough to each other to be able to set up an NFC communication of good quality. For this reason, in the device 10 according to an aspect of the invention, the secondary module 30 plays the role of "NFC repeater" for the communication between the cell phone 40 and the primary module 20. In other words, the communication circuit 35 of the secondary module 30 is configured to receive a signal sent by the cell phone 40 and intended for the primary module 20 and to repeat it to the primary module 20. Likewise, the communication circuit 35 of the secondary module 30 is configured to receive a signal sent by the primary module 20 and intended for the cell phone 40 and to repeat it to the cell phone 40. If the primary module 20 is incorporated into the door 11 nearby the handle 12, then the distance separating the primary module 20 from the secondary module 30 will be sufficiently small to allow an exchange of information between these two modules via the NFC technology. It will be noted that the vehicle body separating the door 11 from the handle 12 may disrupt the NFC communication, and it is therefore recommended to keep a distance small enough, for example smaller than 8 cm, to maintain a good communication performance. The distances separating on the one hand the cell phone 40 from the secondary module 30 and on the other hand the secondary module 30 from the primary module 20, are then sufficiently small (for example smaller than 8 cm) in order to allow NFC communications between the cell phone 40 and the primary module 20 via the secondary module 30. The use of the secondary module 30 as repeater then allows a communication based on the NFC technology to be set up between the cell phone 40 and the primary module 20 even if the distance between these two elements is larger than the maximum distance generally expected to be required to allow an NFC contactless communication.

The retransmission carried out by the secondary module 30 may be a reproduction, i.e. the flux of data bits sent by the cell phone 40 or the primary module 20 and received by the secondary module 30 may be sent on as such, without processing and without modification, by the secondary module 30. In another example, it may be envisioned for the secondary module 30 to process and/or modify a stream of data bits received by the secondary module 30 from the cell phone 40 or the primary module 20.

In particular embodiments, the communication circuit 25 of the primary module 20 and the communication circuit 35 of the secondary module 30 do not exchange information provided that a cell phone 40 is not present. Once the secondary module 30 has detected the presence of the cell phone 40, it informs the primary module 20 thereof and then plays the role of NFC repeater between the primary module 20 and the cell phone 40.

For example, the NFC communication may be initiated by the secondary module 30 (which then functions in "reader" mode) by sending a command to the cell phone 40 (which then functions in "card emulation" mode), which responds to the received command. An NFC communication in peer-to-peer mode may then be set up between the primary module 20 and the cell phone 40, which may then exchange, in turn, information via the secondary module 30, which plays the role of NFC repeater. According to another possible example, on initiation of the communication the secondary module 30 may operate in "card emulation" mode and the cell phone 40 may operate in "reader" mode.

In particular embodiments, the communication circuit 25 of the primary module 20 and the communication circuit 35 of the secondary module 30 may furthermore be used to exchange information between the primary module 20 and the secondary module 30 in a way that is completely independent of the cell phone 40.

This information may correspond, for example, to an indication of the detection of the presence of a hand of a user by a capacitive sensor belonging to the control circuit 34. This indication may then trigger the deployment of the handle 12 if the latter is retractable. In another example, it may be a question of an indication of authentication of a user based on a signal emitted by an electronic pass. The primary module 20 may then for example trigger unlocking of the door 11 on reception of this indication sent by the secondary module 30.

Figure 2:
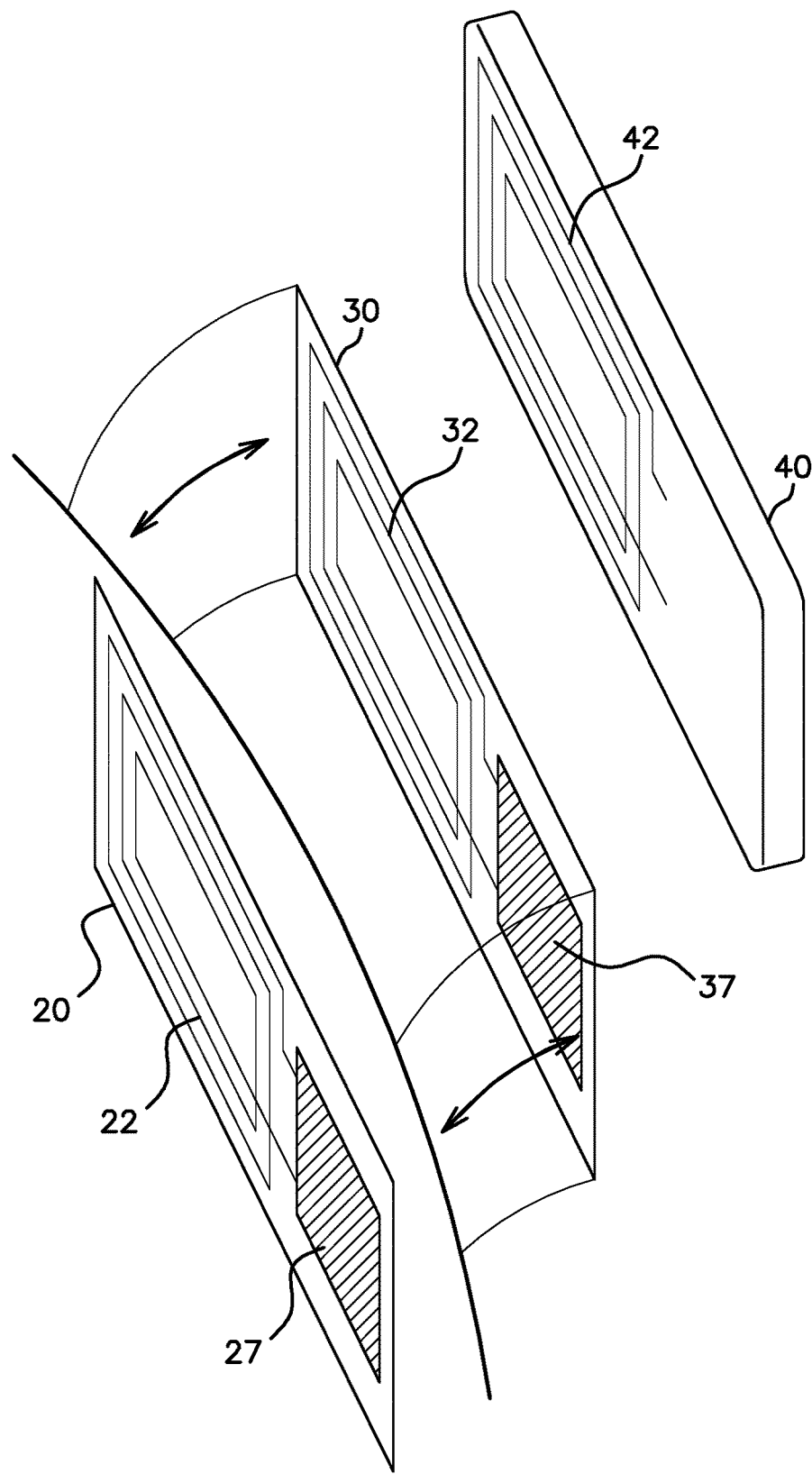
FIG. 2: a schematic representation of a perspective view of a schematic representation of one embodiment of the device according to an aspect of the invention.

FIG. 2 schematically shows a perspective view of one embodiment of the device 10. FIG. 2 in particular illustrates the arrangement of the secondary coil 32 of the secondary module 30, which is integrated into the handle 12, with respect to the primary coil 22 of the primary module 20, which is integrated into the door 11.

In this embodiment, the primary coil 22 and the secondary coil 32 have parallel respective axes and have, in a plane orthogonal to said axes, identical rectangle shapes.

Advantageously, the primary coil 22 and the secondary coil 32 are positioned facing each other in order to optimize the inductive coupling that exists between these two coils. In addition, in the example shown, the axes of the primary coil 22 and of the secondary coil 32 are substantially perpendicular to the plane of the door 11 in order to optimize the communication with the cell phone 40. Specifically, with these arrangements, the antenna 42 the cell phone 40 may easily be placed facing the secondary coil 32. It is enough to do this to bring either side of the cell phone 40 closer to the handle 12 into which the secondary module 30 is integrated.

In FIG. 2, the element 27 schematically represents an electronic unit incorporating the control circuit 24 and the communication circuit 25 of the primary module 20, whereas the element 37 represents an electronic unit incorporating the control circuit 34, the communication circuit 35, and the remote power supply circuit 36 of the secondary module 30. The element 37 may in particular comprise one or more capacitive sensors placed on the exterior face of the handle 12 and that for example serve to the detect the presence of a hand of a user.

In the embodiment shown in FIG. 2, the handle 12 is retractable, i.e. the handle 12, and therefore the secondary module 30, move with a translational movement 13 perpendicular to the plane of the door 11 between a retracted position (in which the secondary coil 32 is located as close as it gets to the primary coil 22) and a deployed position (in which the secondary coil 32 is located as far as it gets from the primary coil 22). When the handle 12 is in the retracted position, the distance separating the primary coil 22 from the secondary coil 32 is smaller—and therefore the amplitude of the magnetic field generated by the primary coil 22 and passing through the secondary coil 32 is higher—than when the handle 12 is deployed. As will be described in detail below with reference to FIG. 5, this physical effect explains how it is possible to estimate the position of the handle 12 with respect to the door 11. In particular, it is possible to determine, depending on the strength of the magnetic coupling that exists between the primary coil 22 and the secondary coil 32, whether the handle 12 is in retracted position or in deployed position.

The primary coil 22 or the secondary coil 32 may comprise one or more turns. They may be formed for example of coplanar tracks formed on printed circuit boards incorporating the circuits of the primary module 20 and of the secondary module 30, respectively.

According to other embodiments, the primary coil 22 or the secondary coil 32 may consist of the winding of several turns that are then superimposed about their respective axis.

It should be noted that other arrangements of the primary coil 22 and of the secondary coil 32 may be contemplated, and these are merely variants of aspects of the invention. For example, the primary coil 22 and/or the secondary coil 32 could have turns of circular shape. According to another example, the turns of the primary coil 22 could have a different size from those of the turns of the secondary coil 32.

It should also be noted that other types of movement of the secondary coil 32 with respect to the primary coil 22 may be contemplated, such as for example a movement along a curve.

Lastly, although FIG. 2 shows the case of a deployable handle 12, nothing prevents the device 10 from being used in the case of a fixed handle. In this case, only the remote power supply and communication functions will be used.

Figure 3:
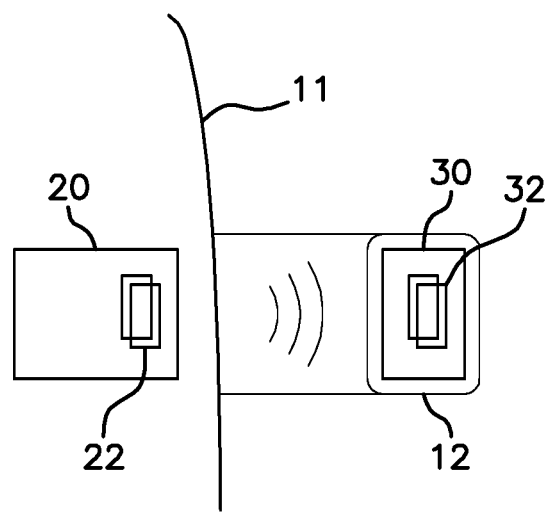
FIG. 3: schematic representations of the primary module and of the secondary module when the door handle is in deployed position.
Figure 3:
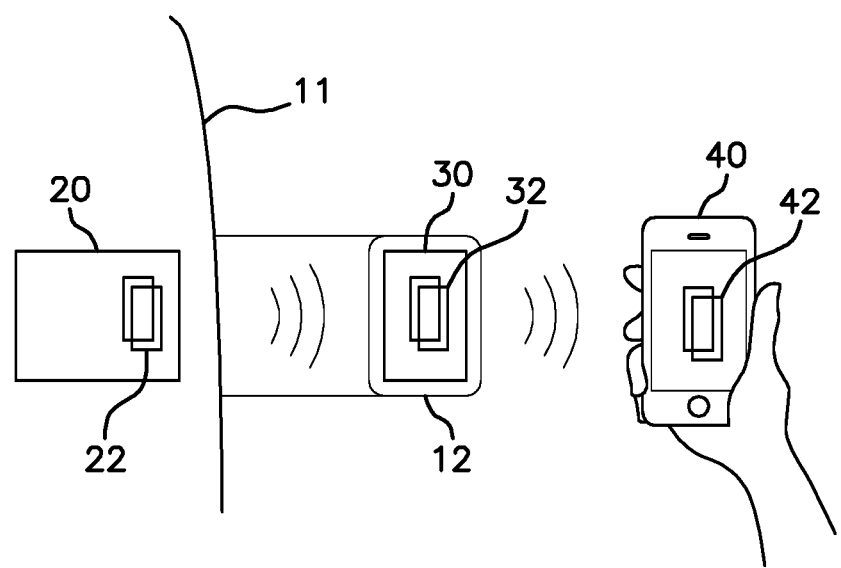

FIG. 3 contains two schematic representations of the primary module 20 and of the secondary module 30 when the handle 12 of the door 11 is in deployed position.

Portion a) of FIG. 3 schematically shows, seen in cross section, the primary module 20 positioned in the door 11 of the motor vehicle (it is possible in particular to see the primary coil 22 there), and the secondary module 30 integrated into the handle 12 of the door 11 (it is possible in particular to see the secondary coil 32 there). The primary module 20 and the secondary module 30 may then communicate together, for example in order to exchange information relating to the detection of the presence of a user, or indeed to his authentication. Specifically, the primary coil 22 and the secondary coil 32 are separated by only a few centimeters, and an NFC communication is then possible.

Portion b) of FIG. 3 schematically shows, seen in the same cross section, the case where a communication must be set up between the cell phone 40 and the primary module 20. As the handle 12 is deployed, the antenna 42 of the cell phone 40 cannot be positioned facing the primary coil 22 closely enough to correctly set up an NFC communication between the cell phone 40 and the primary module 20. In this case, and as explained above with reference to FIG. 1, the secondary module 30 plays the role of NFC repeater, i.e. the communication circuit 35 of the secondary module 30 is configured to receive, via the secondary coil 32, a signal sent by the mobile telephone 40, in order to repeat it to the primary module 20. Likewise, the communication circuit 35 of the secondary module 30 is configured to receive a signal sent by the primary circuit 20, in order to repeat it to the cell phone 40.

It should be noted that FIG. 3 could also applied to the case where the handle 12 is fixed.

Figure 4:
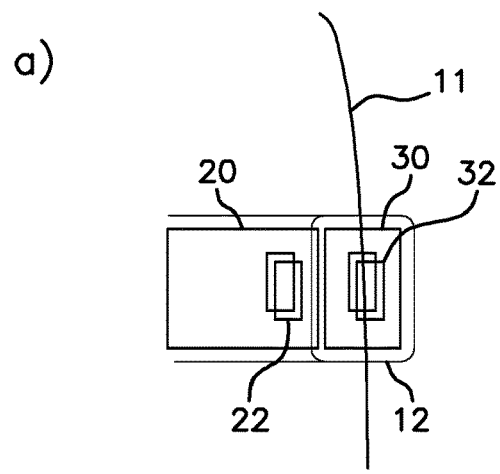
FIG. 4: a plurality of schematic representations of the primary module and of the secondary module when the door handle is in retracted position.
Figure 4:
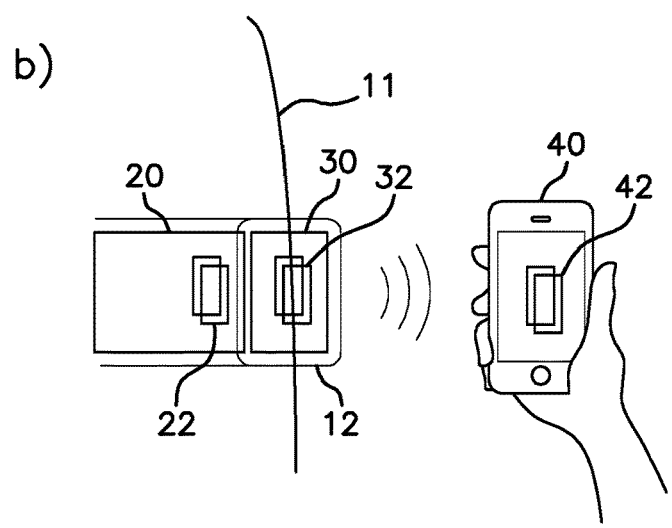
Figure 4:
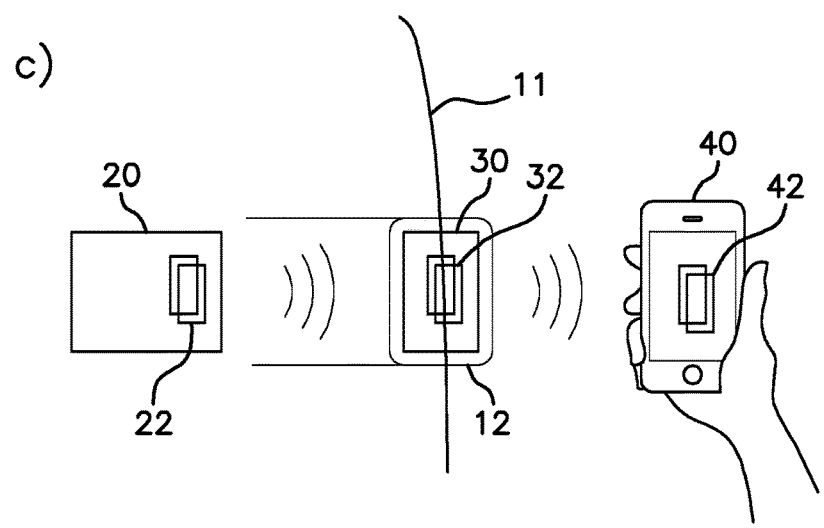

FIG. 4 contains a number of schematic representations of the primary module 20 and of the secondary module 30 when the handle 12 of the door 11 is in retracted position.

Portions a) and b) of FIG. 4 show an embodiment in which the primary module 20 remains fixed when the handle 12 moves between a deployed position and a retracted position. It may then be seen that when the handle 12 is in the retracted position, the secondary coil 32 is particularly close to the primary coil 22. An NFC communication may be set up between the primary module 20 and the secondary module 30.

Portion b) of FIG. 4 shows the case where a communication must be set up between the cell phone 40 and the primary module 20. As the handle 12 is retracted, it no longer prevents the antenna 42 of the mobile phone 40 from being positioned close enough (i.e. for example at less than 8 cm from) the primary coil 22 of the primary module 20. The communication may therefore be set up directly between the cell phone 40 and the primary module 20 without the secondary module 30 playing the role of repeater. In this case, the control circuit 34 may be configured to deactivate (activate, respectively) in the communication circuit 35 the repeater function of the secondary module 30 when the handle 12 is in the retracted (deployed, respectively) position. It will be explained below, with reference to FIG. 5, how it is possible for the control circuit 34 to determine whether the handle 12 is in retracted position or in deployed position. According to other modes of implementation, it is also envisionable to keep the repeater function of the secondary module 30 activated even when the handle 12 is retracted. In this case, it is for example possible for information sent by the cell phone 40 and intended for the primary module 20 to be received by the primary module 20 in duplicate: on the one hand, directly from the cell phone 40, and on the other hand, from the retransmission by the secondary module 30.

The primary module 20 may however be configured to correctly manage this case, for example by ignoring information identical to information already received beforehand within a predefined time.

Portion c) of FIG. 4 shows a particular embodiment in which the primary module 20 is securely fastened to the handle 12 and undergoes the same movement as that of the secondary module 30 when the handle 12 is moved. In this case, whatever the position of the handle 12, the secondary module 30 must again play the role of repeater in order to allow a communication to be set up between the cell phone 40 and the primary module 20.

Thus, in this case, the control circuit 24 will not be able to estimate the position of the handle 12 depending on the amplitude of the magnetic field flux generated by the primary coil 22 through the secondary coil 32, because said flux will remain substantially constant whatever the position of the handle 12.

Figure 5:
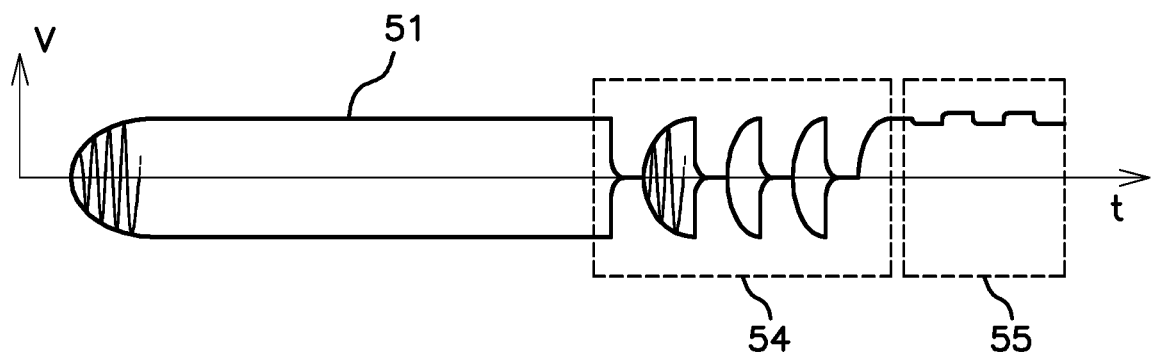
FIG. 5: graphs schematically showing the variation over time in the amplitude of the voltage across the terminals of the primary coil, in the amplitude of the load current in the primary coil, and in the amplitude of the voltage across the terminals of the secondary coil.
Figure 5:
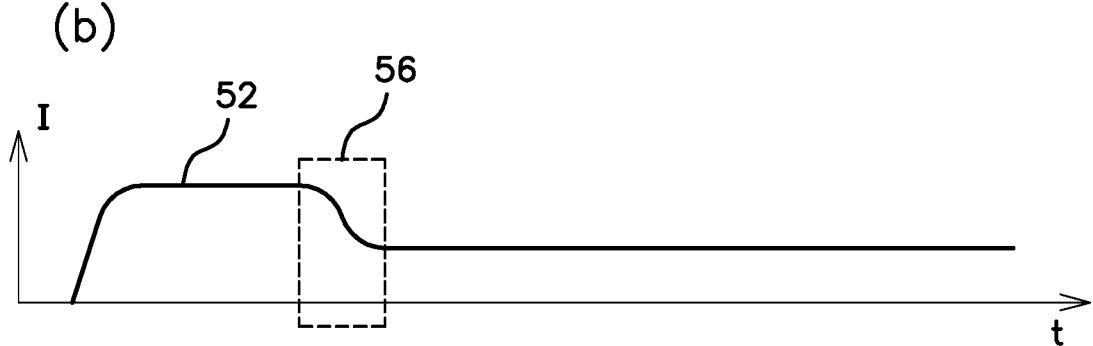
Figure 5:
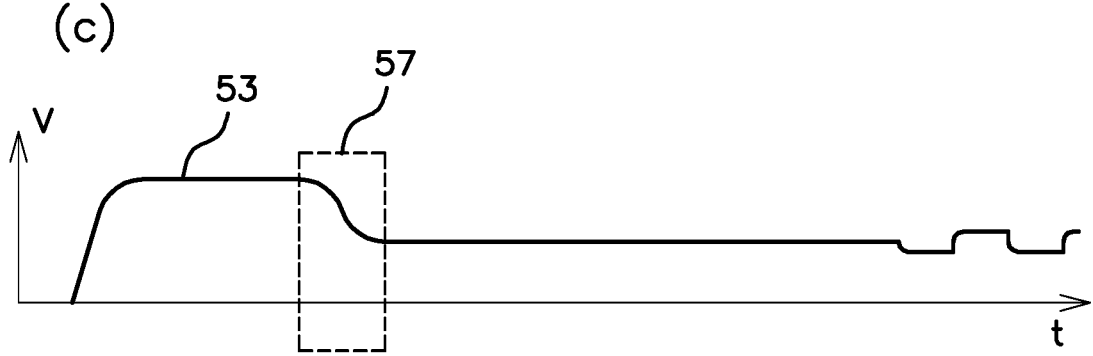

FIG. 5 contains a number of graphs showing the variation over time in the amplitude 51 of the voltage across the terminals of the primary coil 22, in the amplitude 52 of the load current in the primary coil 22, and in the amplitude 53 of the voltage across the terminals of the secondary coil 32. In FIG. 5, the embodiment shown is that described with reference to portions a) and b) of FIG. 4, i.e. the embodiment in which the handle 12 is deployable but the primary module 20 remains fixed with respect to the door 11 whatever the position of the handle 12.

Portion a) of FIG. 5 shows the variation over time in the voltage across the terminals of the primary coil 22. The curve 51 in particular shows the envelope of the amplitude of the AC voltage applied by the primary module 20 across the terminals of the primary coil 22.

The amplitude 51 of the voltage across the terminals of the primary coil 22 is generally constant. It may however be modulated, as shown in portion 54 of the graph, so as to create a signal that conveys information to be sent to the secondary module 30 or to the cell phone 40. The communication circuit 25 is for example configured so as to generate such a signal.

Also, the amplitude 51 of the voltage observed across the terminals of the primary coil 22 may be modulated, as shown in portion 55 of the graph, by a signal conveying information sent by the secondary module 30 or the cell phone 40 and intended for the primary module 20. Such a signal is generated for example by the secondary module 30 by modulating the amplitude 53 of the voltage applied across the terminals of the secondary coil 32 by the communication circuit 35. The electric current flowing through the secondary coil 32 will thus generate an electromagnetic field that will induce the variations in the amplitude 51 of the voltage across the terminals of the primary coil 22, which variations may be seen in portion 55 of the graph.

Advantageously, the average duration of the periods of transmission of information by the primary module 20, i.e. periods such as those shown in portion 54 of the graph of portion a) of FIG. 5, is short in comparison with the average duration of the periods during which the amplitude 51 of the voltage applied across the terminals of the primary coil 22 is close to its maximum. For example, the ratio between these two average durations is less than 5%. Thus, the transmission of information by the primary module 20 has only a small impact on the efficiency of the inductive transmission of energy to the secondary module 30 by the primary module 20. It is also envisionable to use relatively high modulation levels, for example of the order of 75% or more, for the modulation of the voltage across the terminals of the primary coil 22, such that the average amplitude of the voltage across the terminals of the primary coil 22 during a modulation period, such as that shown by portion 54 of the graph, remains relatively high in order to minimize the impact on the inductive transmission of energy to the secondary module 30 by the primary module 20.

It is important to note that, in conventional remote power supply devices, it is known to exchange information relating to charge (level of charge, charging rate, etc.) using the one or more coils that are used to transmit electrical energy by magnetic induction. In the considered example, it is a question of furthermore transmitting information that is not necessarily related to the remote power supply function, such as for example information relating to a car-sharing application, or indeed information generated by sensors that detect the presence of a hand or of a pass of a user.

Radio communication through amplitude modulation of a signal is known to those skilled in the art and will therefore not be described in more detail in the present application.

It will be noted that the amplitude modulation used in the embodiment described here is merely a nonlimiting example of how the signals used to convey information between the primary module 20, the secondary module 30, and the cell phone 40 may be encoded. Thus, other types of modulation could be used, such as for example frequency modulation or phase modulation, and these would merely be variants of aspects of the present invention.

Portion b) of FIG. 5 shows the variation over time in the amplitude 52 of the load current measured in the primary coil 22. In particular, portion 56 of the graph corresponds to a movement of the handle 12 of the door 11 from the retracted position to the deployed position.

The amplitude 52 of the load current in the primary coil 22 varies in a manner correlated with the distance separating the primary coil 22 from the secondary coil 32. Specifically, the smaller this distance, the higher the amplitude of the magnetic field flux generated by the primary coil 22 through the secondary coil 32; in other words, the stronger the inductive coupling between the primary coil 22 and the secondary coil 32, the higher the amplitude 52 of the load current will be as a result.

Given the arrangement of the coils, such as described above with reference to FIGS. 2 to 4, the amplitude 52 of the load current is therefore maximal when the secondary coil 32 is as close as it gets to the primary coil 22, i.e. when the handle 12 of the door 11 is retracted.

When the handle 12 is deployed, the secondary coil 32 gradually gets further from the primary coil 22. The amplitude of the magnetic field flux generated by the primary coil 22 through the secondary coil 32 then gradually decreases, and the same goes for the amplitude 52 of the load current in the primary coil 22. The amplitude 52 of the load current in the first primary coil 22 reaches a minimum value when the secondary coil 32 is furthest from the primary coil 22, i.e. when the handle 12 is entirely deployed.

Thus, the retracted (deployed, respectively) position of the handle 12 corresponds to a maximum (minimum, respectively) value of the amplitude 52 of the load current in the primary coil 22. It is thus possible to determine, in the primary module 20, whether the handle 12 is in the deployed or retracted position depending on the value of the amplitude 52 of the load current. The control circuit 24 of the primary module 20 is for example responsible for measuring the amplitude 52 of the load current in the primary coil 22 and for estimating the position of the handle 12, this for example allowing the motor responsible for the deployment of said handle 12 to be automatically controlled.

It should also be noted that other parameters representative of the amplitude of the magnetic field flux generated by the primary coil 22 through the secondary coil 32 could be used. Thus, instead of measuring the amplitude 52 of the load current in the primary coil 22, it would for example be possible to measure the amplitude of the load voltage across the primary coil 22 if it were considered to be supplied by an AC current source (and not by an AC voltage source).

Portion c) of FIG. 5 shows the variation over time in the amplitude 53 of the voltage across the terminals of the secondary coil 32. This voltage is induced by the magnetic field that is generated by the primary coil 22 and that passes through the secondary coil 32. As explained above, when the handle 12 is in the retracted position, the secondary coil 32 is as close as it gets to the primary coil 22, and the amplitude of the magnetic field flux generated by the primary coil 22 through the secondary coil 32 is maximal. Conversely, when the handle 12 is in deployed position, the secondary coil 32 is as far as it gets from the primary coil 22, and the amplitude of the magnetic field flux generated by the primary coil 22 through the secondary coil 32 is minimal.

The amplitude 53 of the voltage induced by the primary coil 22 in the secondary coil 32 is therefore maximal in retracted position, and it gradually decreases when the secondary coil 32 moves away from the primary coil 22, i.e. when the handle 12 gradually moves to a deployed position (portion 57 of the graph), until a minimum value is reached when the handle 12 reaches the deployed position and can travel no more.

It is thus possible to determine, in the secondary module 30, whether the handle 12 is in the deployed or retracted position depending on the value of the amplitude 53 of the voltage induced in the secondary coil 32. The control circuit 34 of the secondary module 30 is for example responsible for measuring the amplitude 53 of the voltage induced in the secondary coil 32 and for estimating the position of the handle 12, this possibly for example allowing the repetition of the information exchanged between the primary module 20 and the cell phone 40 to be activated or deactivated depending on whether the handle 12 is in deployed or retracted position, as was described with reference to portion b) of FIG. 4. According to another example, the indication that the handle 12 is in deployed or retracted position may be sent by the primary module 20 to the secondary module 30.

Energy is transmitted by inductive coupling from the primary module 20 to the secondary module 30 optimally when the handle 12 of the door 11 is in the retracted position, but also (even though less effectively) in deployed position, and in any position between the retracted position and the deployed position, by virtue of the fact that the secondary coil 32 always remains facing the primary coil 22 during the movement thereof.

An aspect of the invention thus solves the drawbacks of the prior art by providing a wireless device 10 for a handle 12 of a door 11 of a motor vehicle, in which device a secondary module 30 integrated into the handle 12 is remotely supplied with power by a primary module 20 integrated into the door 11. The secondary module 30 may, apart from other optional functions, be employed to play the role of an NFC repeater of communications between a terminal 40 and the primary module 20, for example if a bidirectional communication must be set up between a cell phone and a control unit of the automobile (such as the BCM, acronym of Body Control Module). Lastly, the primary module 20 and/or the secondary module 30 may furthermore be configured to estimate the position of the handle 12 in the particular case where the latter is retractable. The various functions required to remotely supply power and communicate contactlessly, or even, where appropriate, to sense position are all performed using the primary coil 22 and the secondary coil 32, this in particular allowing a miniaturization and a decrease in the complexity and cost of manufacture of the device 10. The absence of electrical cables between the primary module 20 and the secondary module 30 simplifies mechanical integration constraints during the manufacture of the door 11.

An aspect of the invention is however not limited to the exemplary embodiments that are described and shown. In particular, the shape and the arrangement of the primary coil 22 and of the secondary coil 32 as shown in FIGS. 2 to 4 should not be interpreted as limiting. The same applies for the movement 13 of the handle 12 with respect to the door 11, which is not necessarily limited to a rectilinear translational movement.

Furthermore, the description mainly used examples in which the terminal 40 is a cell phone, but it could also be a question of a chip card, or of another connected object such as a pass, bracelet, watch, etc. capable of communicating with the primary module 20 using short-range contactless technology.

The NFC technology presented in the description is given merely by way of nonlimiting example. Specifically, other short-range contactless communication technologies could be envisioned as variants of aspects of the invention.

It should also be noted that, although the embodiments described above relate to a motor vehicle door, an aspect of the invention may very well apply to other opening elements in general.

More generally, although an aspect of the invention lends itself particularly well to the production of a system for a door handle, it is also envisionable to use it for other applications.

The invention claimed is:

1. A device for a handle of a motor vehicle door, said device comprising a primary module integrated into the door and a secondary module integrated into the handle, the primary module comprising a primary coil and the secondary module comprising a secondary coil arranged facing said primary coil,
   the primary module being configured to form an electromagnetic field suitable for supplying electric power to the secondary module by magnetic induction between the primary coil and the secondary coil,
   the primary module comprising a communication circuit suitable for exchanging information with a terminal by the primary coil,
   the secondary module comprising a communication circuit suitable for exchanging information with the terminal and the primary module by the secondary coil, and configured to repeat to the primary module the information sent by the terminal and intended for said primary module, and/or to repeat to the terminal the information sent by the primary module and intended for said terminal,
   wherein the handle is retractable with respect to the door, in which device the primary coil and the secondary coil remain facing each other when the handle moves between a retracted position and a deployed position with respect to the door and the secondary module furthermore comprises a control circuit configured to measure a parameter representative of an amplitude of the magnetic field flux generated by the primary coil through the secondary coil, in order to estimate, depending on said measurements, the position of the handle during its movement between the retracted position and the deployed position.

2. The device as claimed in claim 1, wherein the communication circuits are furthermore configured to exchange information between the primary module and the secondary module independently of the terminal.

3. The device as claimed in claim 1, wherein the parameter representative of the amplitude of the magnetic field flux generated by the primary coil through the secondary coil is an amplitude of a voltage induced across the terminals of said secondary coil.

4. The device as claimed in claim 1, wherein the control circuit of the secondary module is furthermore configured to activate or deactivate, depending on the estimated position of the handle, the repetition of the information exchanged between the primary module and the terminal.

5. The device as claimed in claim 1, wherein the primary module furthermore comprises a control circuit configured to measure a parameter representative of an amplitude of the magnetic field flux generated by the primary coil through the secondary coil, and to estimate, depending on said measurements, the position of the handle during its movement between the retracted position and the deployed position.

6. The device as claimed in claim 5, wherein the parameter representative of the amplitude of the magnetic field flux generated by the primary coil through the secondary coil is an amplitude of a load current flowing through said primary coil.

7. The device as claimed in claim 6, wherein the control circuit of the primary module is furthermore configured so as to control, depending on the estimated position of the handle, a motor that moves the handle with respect to the door.

8. The device as claimed in claim 1, wherein the primary coil and the secondary coil have an axis substantially perpendicular to a plane of the door.

9. A motor vehicle door, comprising a device as claimed in claim 1.

10. A motor vehicle, comprising a door as claimed in claim 9.

11. The device as claimed in claim 5, wherein the control circuit of the primary module is furthermore configured so as to control, depending on the estimated position of the handle, a motor that moves the handle with respect to the door.

* * * * *